(12) United States Patent
Tartler

(10) Patent No.: US 11,001,492 B2
(45) Date of Patent: May 11, 2021

(54) DEVICE FOR SEALING AND EVACUATING A CONTAINER CONTAINING A PASTE-LIKE LIQUID

(71) Applicant: Udo Tartler, Luetzelbach/Haingrund (DE)

(72) Inventor: Udo Tartler, Luetzelbach/Haingrund (DE)

(*) Notice: Subject to any disclaimer, the term of this patent is extended or adjusted under 35 U.S.C. 154(b) by 0 days.

(21) Appl. No.: 16/604,864

(22) PCT Filed: Apr. 11, 2018

(86) PCT No.: PCT/EP2018/059231
§ 371 (c)(1),
(2) Date: Oct. 11, 2019

(87) PCT Pub. No.: WO2018/189217
PCT Pub. Date: Oct. 18, 2018

(65) Prior Publication Data
US 2020/0055724 A1      Feb. 20, 2020

(30) Foreign Application Priority Data
Apr. 11, 2017   (DE) .......................... 102017107825.8

(51) Int. Cl.
*B67D 7/64*        (2010.01)
*F04F 1/14*        (2006.01)
(Continued)

(52) U.S. Cl.
CPC ............... *B67D 7/645* (2013.01); *F04F 1/14* (2013.01); *B65D 83/0044* (2013.01);
(Continued)

(58) Field of Classification Search
CPC .... B67D 7/645; F04F 1/14; F04F 1/06; B65D 83/0044; F04B 53/14; F04C 13/007; F16J 15/00
See application file for complete search history.

(56) References Cited

U.S. PATENT DOCUMENTS 2,298,938 A    10/1942  Griffin, Jr. et al.
3,597,119 A *   8/1971  Gratzmuller ............ F04B 53/00
                                                    417/360
(Continued)

FOREIGN PATENT DOCUMENTS

DE    20 2004 009 185 U1    10/2005
DE    10 2007 003 972 A1     7/2008
(Continued)

OTHER PUBLICATIONS

International Search Report and Written Opinion for International Application No. PCT/EP2018/059231, dated Jul. 13, 2018.
(Continued)

*Primary Examiner* — Donnell A Long
(74) *Attorney, Agent, or Firm* — Wolf, Greenfield & Sacks, P.C.

(57) ABSTRACT

A follower plate device for sealing and evacuating a container that has a cylindrical inner contour and contains a particularly paste-like liquid. The device comprises a seal arranged on a periphery of the device and designed so as to be able to be inserted into the cylindrical inner contour of the container such that it seals around the periphery, and marking the boundary between an outer side of the device and an inner side of the device, and a line extending through from the inner side to the outer side of the follower plate device, arranged on the outer side for connecting to a line connection leading further to an evacuation pump. The follower (Continued)

Figure 1:
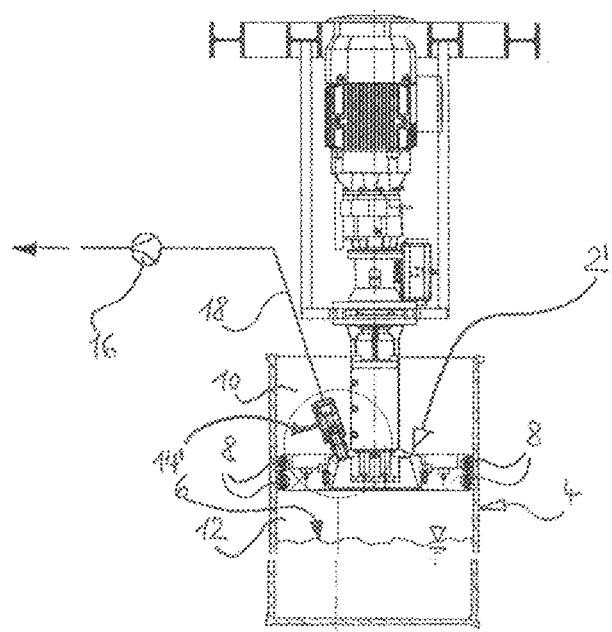

plate device further comprises a replaceable open-pored porous component through which the line is guided.

8 Claims, 2 Drawing Sheets

(51) Int. Cl.
   *B65D 83/00* (2006.01)
   *F04B 53/14* (2006.01)
   *F04C 13/00* (2006.01)
   *F16J 15/00* (2006.01)

(52) U.S. Cl.
   CPC ............ *F04B 53/14* (2013.01); *F04C 13/007* (2013.01); *F16J 15/00* (2013.01)

(56) References Cited

U.S. PATENT DOCUMENTS

| | | | |
|---|---|---|---|
| 3,927,576 A | 12/1975 | Colletti | |
| 3,945,772 A * | 3/1976 | Van de Moortele | F04B 13/02 417/489 |
| 3,976,229 A | 8/1976 | Jackson | |
| 5,257,723 A | 11/1993 | Bagung | |
| 6,076,705 A * | 6/2000 | Heckmann | B29B 13/022 222/146.5 |
| 7,063,911 B1 * | 6/2006 | Nagai | B29C 45/14344 429/435 |
| 2004/0159437 A1 * | 8/2004 | Choi | E21B 43/01 166/335 |
| 2007/0039978 A1 * | 2/2007 | Scheugenpflug | F04B 23/028 222/252 |
| 2008/0023082 A1 * | 1/2008 | Schucker | B67D 7/645 137/565.17 |
| 2015/0377231 A1 * | 12/2015 | Bowen | F04B 49/04 417/434 |
| 2016/0016785 A1 * | 1/2016 | Tartler | B67D 7/0227 222/383.1 |
| 2018/0061676 A1 * | 3/2018 | Kashiyama | F04B 23/06 |
| 2019/0293067 A1 * | 9/2019 | Bonvilain | F04B 1/0452 |

FOREIGN PATENT DOCUMENTS

| | | |
|---|---|---|
| DE | 20 2013 004 757 U1 | 7/2014 |
| DE | 10 2013 005 965 A1 | 10/2014 |
| WO | WO 2005/121616 A1 | 12/2005 |

OTHER PUBLICATIONS

International Preliminary Report on Patentability for International Application No. PCT/EP2018/059231, dated Oct. 24, 2019.

* cited by examiner

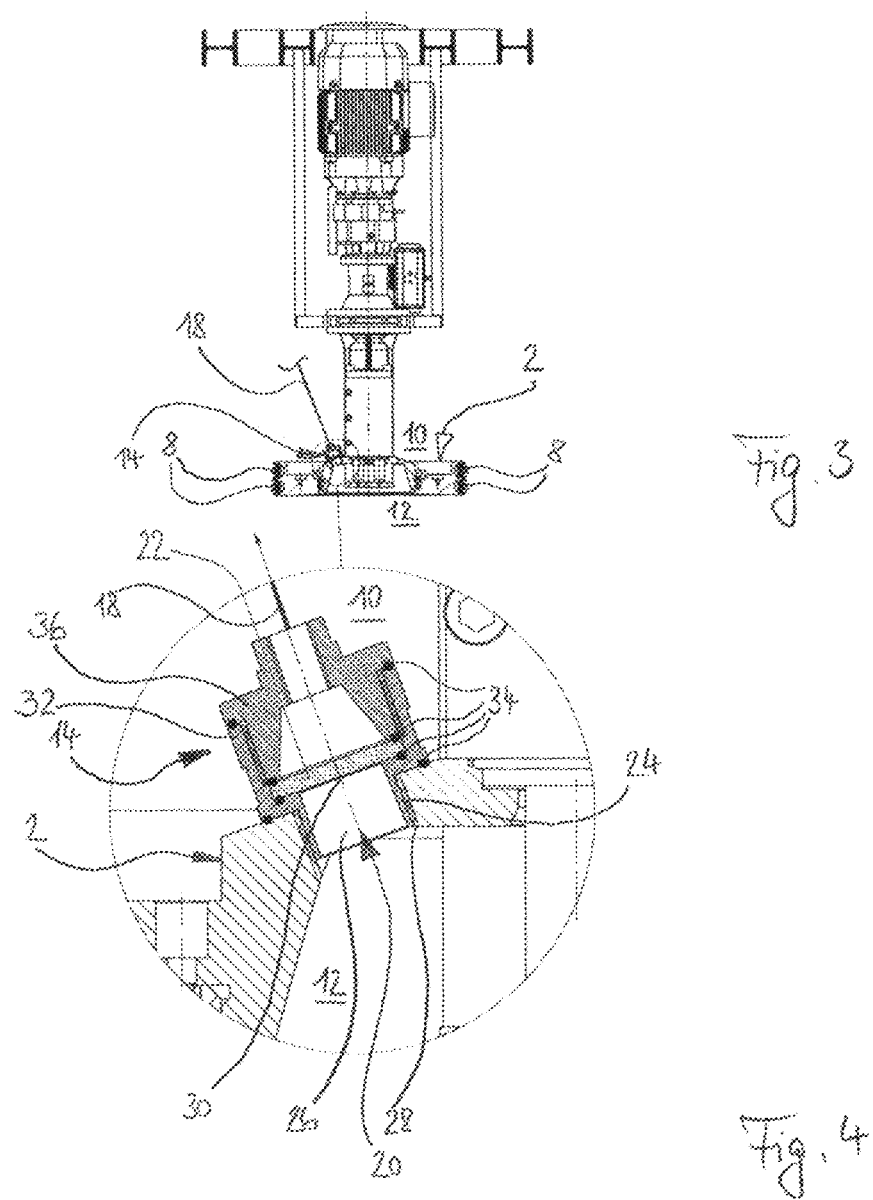

DEVICE FOR SEALING AND EVACUATING A CONTAINER CONTAINING A PASTE-LIKE LIQUID

CROSS-REFERENCE TO RELATED APPLICATIONS

This application is a national stage filing under 35 U.S.C. § 371 of international application PCT/EP2018/059231, filed Apr. 11, 2018, which claims priority to German application 10 2017 107 825.8, filed Apr. 11, 2017, each of which is herein incorporated by reference in its entirety.

The present invention improves a barrel follower plate device for sealing and evacuating a container having a cylindrical inner contour and containing an in particular paste-like liquid.

It is a known process task, for example in the manufacture and processing of multi-component plastics, to discharge paste-like (highly viscous) materials which are filled into cylindrical barrels, typically made of sheet metal or plastic, out of the barrels in the further processing stage using pumps (generally special pumps for highly viscous liquids). As the materials are not always self-levelling, in other words they are so viscous that they do not form an even, horizontal liquid surface as a result of their dead weight alone, what are known as "barrel follower plates" are used: Follower plates are lid devices or sealing devices in the form of a cylinder piston that (after removal of the actual barrel lid) are inserted into the barrel vertically from above and are equipped with gaskets forming a seal against the barrel wall all the way around the periphery of the barrel follower plate. Barrel follower plates therefore form a hermetically sealed, rigid cover over the liquid and together with the barrel container surround the liquid fully and tightly. Once inserted into the barrel, the barrel follower plates are guided linearly and lowered onto the material, driven hydraulically, pneumatically or electrically, for example, or by the dead weight of the follower plate. The aim of lowering the plate in this way is to bring the underside of the follower plate into contact with the liquid, as free from cavities and air inclusions as possible, in order to discharge the liquid from the container through a discharge opening in the follower plate using a feed pump (which is normally mounted directly on the follower plate).

The containers used for these liquids are usually barrels having an interior with a cylindrical, in particular a perfectly cylindrical inner contour (possibly with stiffening peripheral or longitudinal beading), wherein the inner contour leads to an outer opening in the interior, namely to the outer barrel opening, usually without any narrowing.

It is certainly crucial for pumping highly viscous liquids, due in particular to the features of the pumps used for this, that there are, wherever possible, no air inclusions, or at least only as few and as small air inclusions as possible, in the liquid, in other words in particular in the barrel itself and underneath the barrel follower plate.

There is a resulting problem when inserting the barrel follower plate—and consequently regularly during industrial processes when changing the barrel once a barrel is empty and therefore needs replacing with a full barrel—of ensuring as far as possible that no air gets into the feed and dosing pump. As the barrels are usually not filled to the brim, there is a certain amount of air between the material surface and the level at which the barrel follower plate is inserted (lid opening of the barrel). In the prior art, this air is discharged through venting arrangements in the form of, for example, drill holes with a manual closure, similar, for example, to a threaded rod, or the air is discharged through manual, pneumatic or electric ball valves. These venting arrangements are opened when the barrel follower plate is inserted into the barrel. The ensuing air pressure can be discharged via the venting arrangement. This immediately presents a risk of material being sprayed through the venting arrangement to the outside, as material from the last barrel change may still be contained in the venting arrangement, for example. It is also possible that a quick, uncontrolled dropping of the barrel follower plate could occur if the air is discharged suddenly. As is generally known, as the venting arrangement has to stay open until it contains absolutely no more air, it is often not possible for the user to avoid reaching into the barrel down to where the barrel follower plate has been lowered in order to change e.g. bowls placed there to catch material from the venting arrangement. Serious injury could therefore be sustained if the barrel follower plate then suddenly lowers or as a result of the risk of the user being splashed with material.

In terms of the process, air in the system is an extremely adverse occurrence, as from air inclusions of a certain size and volume the feed pumps cannot seal said air inclusions against the material in the system and/or because the air introduced leads to mixing ratio problems or even to the process being aborted. Users therefore often accept that they will have to remove a large amount of material from the venting arrangement (and therefore lose it) in order to ensure as far as possible that no air is left in the system.

The object of the present invention is to create a device for sealing and for evacuating air from a container, in particular above a paste-like liquid in said container and underneath a barrel follower plate, which is more suitable for the process, is more user-friendly, saves costs and in particular provides a solution to the aforementioned disadvantages.

This object is solved by a device with the features defined in claim 1. Preferred embodiments are specified in the dependent claims.

The barrel follower plate device according to the invention serves in the technical processes described at the beginning of this document, for example, to seal and to extract air from a container having a cylindrical inner contour and containing an in particular paste-like liquid. The invention prevents air entering the system, the risk of splashing, the loss of material and the risk to the user when inserting the device and in particular when changing the container.

The barrel follower plate device according to the invention has a seal which is arranged around a periphery of the device and is adapted to be insertable into the cylindrical inner contour of a container (in particular of one of the containers already described) so as to form a seal around the periphery of the container. The inner contour of the container to which the device according to the invention has been adapted preferably leads to an external opening of the container without any narrowing. The inner contour is preferably perfectly cylindrical; it is particularly preferably the perfectly cylindrical inner contour of a smooth-walled steel sheet lidded barrel with a clamping ring closure (for example: the diameter of which in a widely used embodiment is 572 mm) or of a container made from plastic. The inner contour to which the invention has been adapted can have beading (or other structures to increase the rigidity of the barrel, for example), in particular along the cylinder axis. To this end, the seal is preferably adapted such that it settles elastically into the shape of this structure, for example.

The seal of the barrel follower plate device according to the invention separates an outside of the device from an inside of the device.

A feedthrough leads from the inside to the outside of the barrel follower plate device. On the outside, the feedthrough is designed to connect a line connection further leading to a vacuum pump or evacuation pump.

The feedthrough leads through an open-pored porous component. The porous material lets through gas (in particular air) to be evacuated by the vacuum pump while forming a type of labyrinth seal for the in particular paste-like liquid in the container. The porous component consists primarily of a composite aluminium granulate/epoxy resin material such as Metapor®. However, all materials and structures (which are meant by open-pored porous) that allow air through and only minimal or very little liquid (which means that as little viscous liquid as possible in particular will be able to penetrate the pores and solidify there) are suitable. For example, a fleece such as Goretex® is also conceivable, whereby such materials and structures that are not inherently stable may require a shape-retaining support structure.

The porous component can be replaced, particularly preferably from the outside of the barrel follower plate device, in order namely to be able to replace it quickly and easily if liquid has penetrated pores and solidified there, thereby impairing the penetrability of the porous component. The porous component is particularly preferably only as large as needed to fully fill or cover a cross-section of the feedthrough and be securely positioned in the feedthrough in such a manner that it can be replaced.

A connecting device can be placed on the outside of the device that is designed for the (direct) connection of a vacuum pump. Alternatively, a line can be (indirectly) connected to the connecting device, which line is then connected to a vacuum pump. Said "vacuum pump" or "evacuation pump" represents a gas feed pump or system that is designed to produce vacuum (and in particular possibly also excess pressure to remove an emptied barrel in the processes described above, namely when the barrel follower plate is pulled out).

At least the end section of the feedthrough leading from the inside to the outside of the barrel follower plate device can be integrated into the connecting device. The open-pored porous component through which the feedthrough is guided can also be integrated into the connecting device so as to be replaceable.

Using the invention, the air in the container can be evacuated from the liquid surface (but also from within the liquid material, there in particular in the form of pockets or bubbles close to the material surface) directly through the barrel follower plate as the barrel follower plate is being attached.

The vacuum venting through the open-pored porous component prevents the discharge of material of the past (always associated with a loss of material) which was needed as a control mechanism for conventional venting. For the air is now extracted with a vacuum pump, but the paste-like material does not penetrate the porous material (due to the small pore size of preferably less than 1 mm, but also due to the "labyrinthine" nature of the open-pored porous material), or only does so slightly. No human intervention on the device while changing the barrel is now required, which means that the associated risks can be ruled out:

The barrel follower plate can namely be lowered slowly in a controlled manner, under vacuum, by means of the invention (for example by using a travel drive, which will not be described in any further detail here, for moving the barrel follower plate), so that it eventually sits on the liquid surface. This happens according to the invention, without material reaching the outside through the connecting device on the vacuum line as the barrel follower plate is being attached, due to the labyrinth seal function of the porous component. That the space above the liquid is then fully evacuated and the barrel follower plate is sitting fully on the liquid is easy to represent according to the invention by control or regulation technology, as the suction pressure suddenly rises when the air is extracted and liquid is then extracted from the inside of the container towards the porous component.

In view of this consideration, it is also particularly preferable to arrange the feedthrough at the highest point on the inside of the follower plate (inserted in its intended orientation in an upright barrel). Several such feedthroughs (for example, in several connecting devices) can also be integrated into a follower plate device (with all said feedthroughs then preferably leading to a vacuum pump.

This also enables faults (for example, in a mixing machine in a subsequent dosing and removal process) as a result of air forming between the liquid surface and the barrel follower plate to be avoided. This means that it is now possible (with pneumatic or hydraulic cylinders or with electric units) to fill the liquid feed pump (which is located on the follower plate, for example) by pressing the follower plate onto the material: Material is pressed into the feed pump—and this occurs without creating air inclusions, as the space above the liquid (through which the follower plate is lowered) is evacuated before the plate is lowered and then while it is being lowered, and this ensures that no air is pressed into the feed pump at the same time.

If the porous component is dirty and/or no longer sufficiently penetrable, it is advantageous to replace it—and it is therefore replaceable according to the invention: The connecting device is (where appropriate) preferably attached to the device so as to be detachable from the outside. The porous component is preferably integrated into the connecting device so as to be replaceable either on its own or as part of an assembly. It is particularly preferable that the porous component is a circular disc-shaped element made from an open-pored porous material, and particularly preferably made from Metapor® of varying porosity. Externally replaceable in this context means in particular replaceable from the outside of the device and in particular also without having to dismantle the follower plate and/or other elements covering and/or touching the liquid in the container and/or without having to remove it/them from the container 4 to do so.

An average pore diameter of between 0.0001 mm and 1 mm has been established for the porous component, depending on the viscosity and the phase stability of the material to be sealed. For example, an average pore diameter of between approximately 0.001 mm and 0.01 mm is suitable for a material with a viscosity roughly the same as that of water (or for a material with higher viscosity but unstable phases which deposits a phase with a viscosity roughly the same as that of water under evacuation vacuum), whereas an average pore diameter of between 0.1 mm and 1 mm is advantageous for sealing a paste-like liquid with a viscosity of between 50,000 mPas and 200,000 mPas, such as Raku-Tool® CP-6070 from Rampf Tooling or a similar material from another manufacturer.

Through the same barrel follower plate device according to the invention, the air can also be added or injected when the barrel follower plate device preferably inserted in a vertically linear direction is removed from the container (using a hydraulic, pneumatic or electric actuator, to replace an empty barrel with a full one, for example) so that removal is not impeded by any vacuum as a result of removing the barrel follower plate. Active removal of the device "pneumatically" by pumping air underneath the device, thus pushing the device out of the container at least is conceivable, and particularly preferably a combination of active removal with an actuator and the entry of compressed air underneath the follower plate. In any case, the liquid that may have been added to the porous component (when the air was last extracted) is then also advantageously injected back into the container when air is injected, thus enabling the perhaps impaired function of the porous component to be restored (or at least sufficiently improved again) and also prolonging the time when the porous component needs to be replaced with a new one as a spare part.

The invention together with the control system designed for said invention can ensure that fully automatic retraction and extension of the barrel follower plate becomes a reliable and smooth standard process that also saves costs, as no material is lost. A barrel change, in particular including the widely used cylindrical lidded barrels with a clamping ring closure containing paste-like materials such as those used for the industrial mixing process for two- or multi-component plastic, can be performed also for the dosing process without any loss of material and with considerably increased safety.

These and other advantages and features of the invention are described in more detail based on the following illustrations of an exemplary embodiment of the invention.

Figure 2:
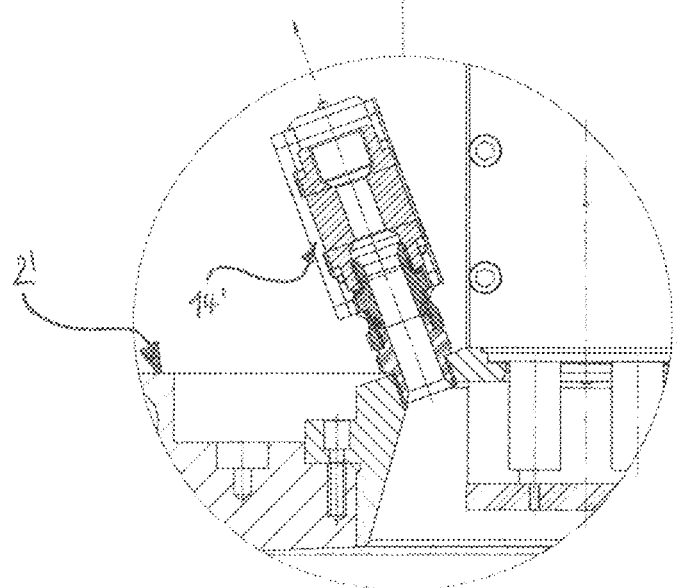

FIG. 1 shows a cropped side view of a barrel follower plate with a connecting device for a vacuum line according to the prior art, FIG. 2 shows the connecting device as an extract from FIG. 1 according to the prior art, FIG. 3 shows a cropped side view of a barrel follower plate with a connecting device for a vacuum line according to the invention, and FIG. 4 shows the connecting device as an extract from FIG. 3 according to the prior art.

The illustrated devices 2, 2' serve to seal and to extract air from a container 4, which has a cylindrical inner contour and contains an in particular paste-like liquid 6.

The device according to the invention has a seal 8 which is arranged around the periphery of the device 2 and is adapted to be insertable into the perfectly cylindrical inner contour of a container 4 so as to form a seal around the periphery of the container. The seal 8 of the device according to the invention separates an outside 10 of the device 2 from an inside 12 of the device.

A connecting device 14', 14 is arranged on the outside 10 of the device 2, which is designed for the connection of a vacuum pump 16 (only shown schematically as a symbol): A line 18 (only shown schematically as a line), which is then connected to a vacuum pump 16, can be connected to the connecting device 14', 14.

A feedthrough 20, 20' (along the centre line 20, 20') leading from the inside to the outside of the barrel follower plate device is integrated into the connecting device 14', 14.

A replaceable, open-pored porous component 22 through which the feedthrough 20 is guided is also integrated into the connecting device 14 according to the invention (FIGS. 3 and 4). The porous component 22 lets through air extracted by the vacuum pump 16, while forming a type of labyrinth seal for the paste-like liquid 6 in the container (the container 4, liquid 6 and vacuum pump 16 are not shown in FIGS. 3 and 4, but they are arranged around the device 2 according to the invention in FIGS. 3 and 4 in the same way as around the device 2' according to the prior art in FIGS. 1 and 2).

By means of the invention, the air above the liquid surface in container 4 is extracted directly through the barrel follower plate 2 as the barrel follower plate 2 is being attached to the container 4, whereby the vacuum venting through the replaceable, open-pored porous component 22 renders the discharge of material (always associated with loss of material) obsolete, which was previously required as standard with the conventional venting with a ball valve 14' as a control mechanism (when extracting air from the highest point of the barrel follower plate, it was only possible to tell that all air had been extracted from above the liquid surface 6 as material started to escape from the connecting device 14' according to the prior art). The air is namely extracted through the replaceable, open-pored porous component 22 by means of the vacuum pump 16, which allows very little of the paste-like material 6 through (due to the small pore size, but also due to the "labyrinthine" nature of the open-pored porous materials 22). The barrel follower plate 2 can now in a controlled manner, under vacuum, slowly be lowered by means of the invention, so that it eventually sits on the liquid surface 6. According to the invention, this happens without material 6 reaching the outside 10 through the connecting device 16 of the vacuum line 18 as the follower plate 2 is being attached and posing a risk to people and devices, as is the case with the ball valve 14' according to the prior art (FIGS. 1 and 2), namely due to the labyrinth seal function of the porous component 22.

That the space above the liquid 6 is then fully evacuated and the barrel follower plate 2 is sitting fully on the liquid 6 is easy to represent according to the invention by control or regulation technology, as the suction pressure suddenly rises when the air is extracted and liquid 6 is then extracted from the inside of the container 4 towards the porous component 22.

The feedthrough 20 is arranged at the highest point on the inside of the follower plate 2 (inserted in its intended orientation in an upright barrel 4 as shown, in other words with the container on a vertical axis).

If the porous component 22 is dirty and/or no longer sufficiently penetrable, it must be replaced—and is therefore replaceable as shown—namely externally (from the outside 10), in other words in particular without having to remove the follower plate from the container 4: The connecting device 14 as a whole is attached to the barrel follower plate device 2 (FIG. 4) so as to be detachable from the outside in that it is screwable (with a male thread 24) from the outside (and is screwed in as shown in the illustrations) into a through hole with a female thread 28 (into which a male thread can be screwed from the outside 10), first partially in the form of a sleeve 26. The porous component 22 in turn is then replaceable in the connecting device 14 (integrable and integrated as shown in the illustrations), namely as a flat, in particular a disc-shaped and in particular a circular disc-shaped element 22 made exclusively from an open-pored porous material 22 which is attachable (and is attached according to the illustrations) on the outlet 30 of the sleeve 26 from the outside 10 so that it covers the outlet 30 of the sleeve 26 (in particular coaxially). The embodiment illustrated shows how the porous component 22 is insertable (and is inserted as shown in the illustrations) into the sleeve outlet 30 centred in a threaded flange 32 of the sleeve 26 of the connecting device 14 and/or sealed with seals 34. A locking sleeve 36 is then (to complete the connecting device 14, as it were, and in turn in particular sealed with seals 34)

screwable (and screwed according to the illustrations) from the outside 10 into the threaded flange 32 against the open-pored porous element 22, in order to generally secure and attach it to in the connecting device 14.

LIST OF REFERENCE NUMBERS

Barrel follower plate devices 2, 2' (' means "according to the prior art")
Container 4
Paste-like liquid 6
Seal 8
Outside 10 of the barrel follower plate device 2
Inside 12 of the barrel follower plate device 2
Connecting device 14, 14'
Vacuum pump 16
Line 18 (only shown schematically as a line)
Feedthrough 20, 20' (along the centre line 20, 20')
Open-pored porous component 22
Male thread 24
Sleeve 26
Through hole with female thread 28
Outlet 30 of sleeve 26
Threaded flange 32
Seals 34
Locking sleeve 36

The invention claimed is:

1. A barrel follower plate device for sealing and evacuating a container having a cylindrical, straight cylindrical or perfectly cylindrical inner contour and containing an in particular paste-like liquid, the barrel follower plate comprising:
    a follower plate body;
    a seal which is arranged around a periphery of the follower plate body, the seal adapted to be insertable into the cylindrical inner contour of the container so as to form a seal around the periphery of the container, and which separates an outside of the device from an inside of the device;
    a feedthrough extending along a straight center line from the inside to the outside of the barrel follower plate device which is designed on the outside to connect a line connection further leading to an evacuation pump; and
    a replaceable, open-pored porous component through which the feedthrough is guided.

2. The device according to claim 1, wherein the porous component is replaceable from the outside.

3. The device according to claim 1, wherein a connecting device for connecting the line connection further leading to the evacuation pump, into which device at least the end section of the feedthrough leading to the outside and the porous component are integrated so as to be replaceable.

4. The device according to claim 3, wherein the connecting device is attached to the barrel follower plate device so as to be detachable from the outside.

5. The device according to claim 1, wherein the porous component is replaceable either on its own or as part of an assembly.

6. The device according to claim 1, wherein the porous component has an average pore diameter of between 0.0001 mm and 1 mm.

7. The device according to claim 1, wherein the porous component has an average pore diameter of between 0.1 mm and 1 mm for sealing a high-grade paste-like liquid with a viscosity of between 50,000 mPas and 5,000,000 mPas.

8. The device according to claim 1, wherein the porous component is made from a composite aluminum granulate/epoxy resin material.

* * * * *